(No Model.)
T. A. WATSON.
TELEPHONE.
No. 246,699. Patented Sept. 6, 1881.
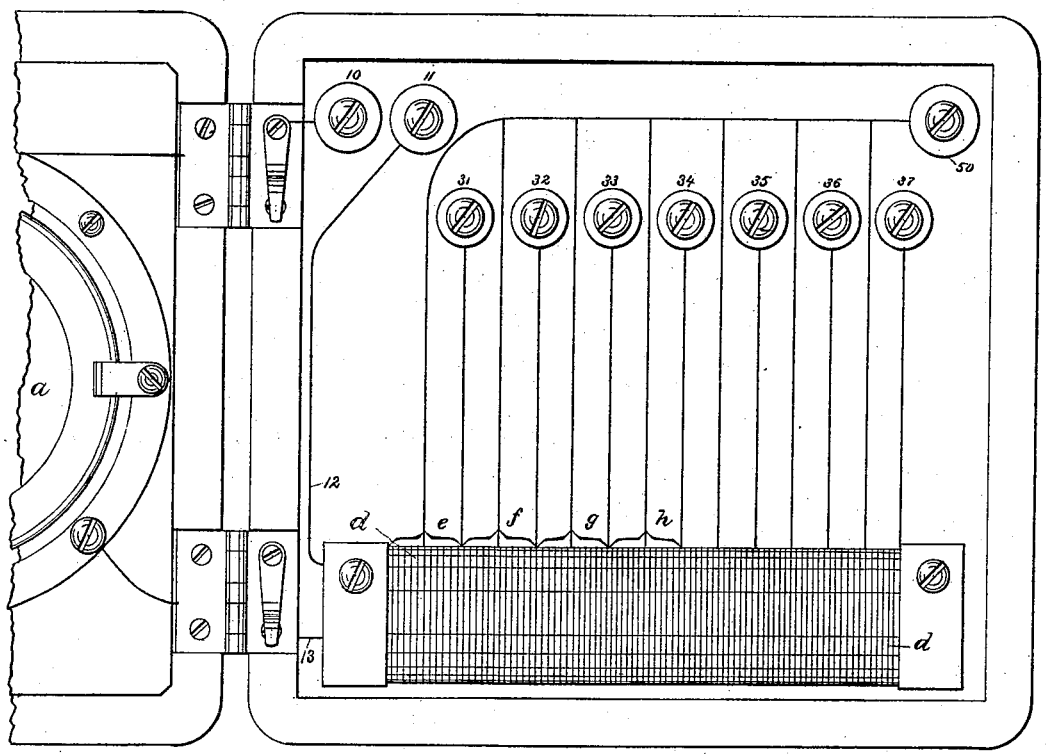
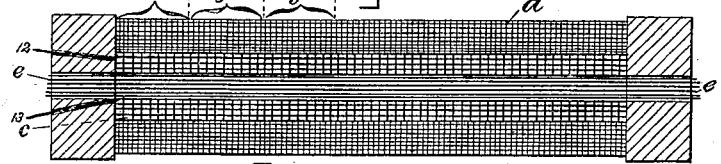
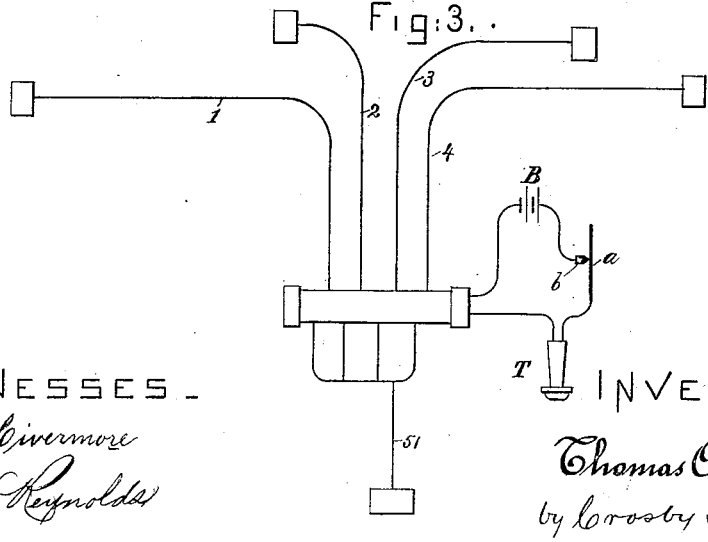
WITNESSES
Jos. P. Livermore
Arthur Reynolds
INVENTOR
Thomas A. Watson
by Crosby & Gregory Attys

UNITED STATES PATENT OFFICE.

THOMAS A. WATSON, OF EVERETT, ASSIGNOR TO THE AMERICAN BELL TELEPHONE COMPANY, OF BOSTON, MASSACHUSETTS.

TELEPHONE.

SPECIFICATION forming part of Letters Patent No. 246,699, dated September 6, 1881.

Application filed August 13, 1880. (No model.)

*To all whom it may concern:*

Be it known that I, THOMAS A. WATSON, of Everett, county of Middlesex, State of Massachusetts, have invented an Improvement in Telephones, of which the following description, in connection with the accompanying drawings, is a specification.

My invention relates to telephones, and has for its object to enable a single-battery transmitter to be placed in communication with several independent circuits at the same time.

In an invention relating to a telephone-exchange system and instrument, in which an application for Letters Patent was filed by me April 29, 1880, I showed and described a system in which several independent telephonic circuits radiating from a central office are in communication with a single central instrument, which was in that instance shown as a magneto-telephone, adapted to be used both for transmitting and receiving messages.

The present invention consists in providing apparatus whereby a microphone or battery transmitter of any usual construction may be employed in such a system as described in my former application referred to; and it consists in the employment of a compound induction-coil having several coils in independent circuits and each adapted to induce electric impulses in the others.

As herein shown, a main or primary coil is placed in circuit with the battery and a receiving magneto-telephone of ordinary construction, and the other coils are wound over this main coil, each occupying a portion of its length. A soft-iron core such as commonly employed causes the inductive effect to be more readily transmitted from one coil to the other.

Figure 1 is a front elevation of a portion of a transmitting-instrument embodying my invention, the inclosing-case being opened; Fig. 2, a longitudinal section of the induction-coil thereof, and Fig. 3 a diagrammatic view, showing the arrangement of the circuits and instruments.

The contact or pressure electrodes $a\ b$ of the transmitter, of any usual construction, in circuit with the local battery B, the poles of which are connected with the binding-screws 10 11, are connected with the terminals 12 13 of one coil, $c$, of the induction-coil $d$. The said coil $c$ in the battery-circuit preferably extends the whole length of the induction-coil $d$, which is provided with the usual core, $e$, of soft-iron wires.

The various circuits 1 2 3, &c., which it is desired should be simultaneously affected by the central transmitting-instrument, are connected at the binding-screws 31 32 33, &c., in circuit with separate coils $e\ f\ g$, &c., of the induction-coil $d$, the said coils being preferably wound upon the outside of the one $c$ in circuit with the battery B, and each occupying a portion of its length. The other terminals of the said coils $e\ f\ g$, &c., are connected with the common binding-screw, 50, and by wire 51 with the ground. A receiving-telephone, T, is also employed in connection with the transmitting-instrument, it being shown as in the same circuit with the electrodes $a\ b$ and battery B.

In operation, the electric impulses produced in the battery-circuit and coil $c$ in the usual manner by the electrodes $a\ b$ will induce similar impulses in all the other coils $e\ f\ g$, &c., of the induction-coil and the circuits 1 2 3, &c., connected therewith, and similarly any impulses produced in any one of the circuits 1 2 3 4, &c., will be transmitted by induction in the induction-coil $d$ to the rest of the circuits, 1 2 3 4, and the circuit of the battery and transmitter and the receiving-telephone T therein, so that this instrument may be employed in an exchange system such as described in my former application, the transmitter-receiving telephone and compound induction-coil of the present invention performing the function of the compound magneto-telephone described in the former invention.

It is obvious that the receiving-telephone T might be placed in circuit with any of the coils of the induction-coil, or that an independent coil thereof might be provided for the said telephone.

I claim—

1. In a microphone, a compound induction-coil containing one helix in circuit with the battery and electrodes of said microphone, and a series of other helices in independent telephonic circuits, whereby the electric impulses produced by the microphone are transmitted to all the said telephonic circuits simultaneously, substantially as described.

2. A series of independent telephonic circuits having helices therein, all included in a common compound induction-coil, whereby electric impulses in any one of the said circuits will induce similar impulses in all the others, substantially as described.

3. The herein-described compound induction-coil, containing a main helix extended over a magnetic core, and a series of independent coils wound upon the outside of the said helix and each extending over a portion of its length, substantially as described.

In testimony whereof I have signed my name to this specification in the presence of two subscribing witnesses.

THOMAS A. WATSON.

Witnesses:
   JOS. P. LIVERMORE,
   N. E. C. WHITNEY.